United States Patent
Tan et al.

(10) Patent No.: US 12,096,225 B2
(45) Date of Patent: Sep. 17, 2024

(54) USING PATTERNS TO PAIR BLUETOOTH DEVICES

(71) Applicant: Dell Products L.P., Round Rock, TX (US)

(72) Inventors: Danilo O. Tan, Austin, TX (US); Harpreet S. Narula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 346 days.

(21) Appl. No.: 17/670,014

(22) Filed: Feb. 11, 2022

(65) Prior Publication Data

US 2023/0262469 A1    Aug. 17, 2023

(51) Int. Cl.
| | |
|---|---|
| *H04W 4/00* | (2018.01) |
| *H04W 12/0471* | (2021.01) |
| *H04W 12/50* | (2021.01) |
| *H04W 12/65* | (2021.01) |
| *H04W 76/14* | (2018.01) |

(52) U.S. Cl.
CPC ........ *H04W 12/65* (2021.01); *H04W 12/0471* (2021.01); *H04W 12/50* (2021.01); *H04W 76/14* (2018.02)

(58) Field of Classification Search
CPC . H04W 12/65; H04W 12/50; H04W 12/0471; H04W 76/14
USPC ........................................................ 370/329
See application file for complete search history.

(56) References Cited

U.S. PATENT DOCUMENTS

| | | | | |
|---|---|---|---|---|
| 8,775,533 | B2 * | 7/2014 | Hassan ................. | H04W 8/005 709/206 |
| 8,792,862 | B1 * | 7/2014 | Juels ..................... | H04W 12/50 455/411 |
| 8,806,023 | B2 * | 8/2014 | Desai .................... | H04W 76/14 709/227 |
| 9,348,421 | B2 * | 5/2016 | Weston .................. | G06F 3/017 |
| 9,503,969 | B1 * | 11/2016 | Zakaria ............. | H04W 52/0229 |
| 9,565,708 | B2 * | 2/2017 | Hassan ................. | H04W 76/14 |
| 10,231,128 | B1 * | 3/2019 | Ziraknejad ............ | H04W 12/08 |
| 10,362,466 | B2 * | 7/2019 | Swanzey ............. | H04L 63/0869 |
| 10,657,242 | B1 * | 5/2020 | Xia ....................... | H04L 9/0825 |
| 10,750,557 | B1 * | 8/2020 | Kim ..................... | H04W 76/14 |
| 10,805,861 | B2 * | 10/2020 | Breaux, III .......... | G06F 3/0227 |
| 10,855,664 | B1 * | 12/2020 | Ziraknejad ............. | H04W 4/02 |
| 10,924,900 | B2 * | 2/2021 | Li ......................... | H04L 12/141 |
| 11,140,157 | B1 * | 10/2021 | Xia ...................... | H04L 63/0853 |
| 11,570,156 | B2 * | 1/2023 | Steffen ................ | H04W 12/50 |
| 11,601,783 | B2 * | 3/2023 | Berardino ............ | H04W 4/023 |
| 11,757,629 | B2 * | 9/2023 | Gupta .................. | H04L 9/0861 713/170 |
| 11,943,834 | B2 * | 3/2024 | Kim ........................ | G06N 3/08 |
| 11,956,248 | B2 * | 4/2024 | Lau ..................... | H04L 63/0442 |
| 11,997,079 | B2 * | 5/2024 | Tesson ................... | H04L 63/08 |
| 2007/0123165 | A1 * | 5/2007 | Sheynman ............ | H04W 8/005 455/41.2 |

(Continued)

*Primary Examiner* — Marceau Milord

(74) *Attorney, Agent, or Firm* — Kirton McConkie; Brian Tucker

(57) ABSTRACT

Bluetooth devices can be paired using patterns. A pattern can be used to ensure that the correct Bluetooth device is being paired. A pattern may also be used to provide security to the pairing process by encrypting the key exchange with keys generated from the pattern. In some implementations, the pattern to be used can be generated based on the device class.

20 Claims, 4 Drawing Sheets

(56) References Cited

U.S. PATENT DOCUMENTS

| | | | | |
|---|---|---|---|---|
| 2008/0268776 A1* | 10/2008 | Amendola | ............ | H04W 8/005 |
| | | | | 455/41.2 |
| 2012/0296986 A1* | 11/2012 | Hassan | ................ | H04W 12/06 |
| | | | | 709/206 |
| 2013/0298208 A1* | 11/2013 | Ayed | ....................... | G06F 21/43 |
| | | | | 375/259 |
| 2015/0318874 A1* | 11/2015 | Donaldson | ............... | H04B 1/00 |
| | | | | 367/135 |
| 2016/0049026 A1* | 2/2016 | Johnson | ................ | H04W 4/027 |
| | | | | 340/5.61 |
| 2016/0162882 A1* | 6/2016 | McClung, III | ........ | G06Q 20/352 |
| | | | | 705/41 |
| 2017/0290077 A1* | 10/2017 | Nilsson | ................ | H04W 12/04 |
| 2018/0219672 A1* | 8/2018 | Schopp | ................ | H04L 9/3213 |
| 2020/0019255 A1* | 1/2020 | Gilbert | ................ | H04L 63/123 |
| 2021/0153014 A1* | 5/2021 | Vanpariya | ............. | G06Q 20/40 |
| 2021/0250790 A1* | 8/2021 | Seeber | ................ | H04W 12/50 |
| 2021/0258308 A1* | 8/2021 | Avetisov | ............. | H04L 9/3215 |
| 2022/0006796 A1* | 1/2022 | Steffen | ................ | H04L 9/0816 |
| 2022/0351201 A1* | 11/2022 | Maus | ................ | G06Q 20/3829 |
| 2023/0156569 A1* | 5/2023 | Breaux, III | ........... | H04W 12/08 |
| | | | | 381/86 |
| 2023/0156570 A1* | 5/2023 | Breaux, III | ............. | H04W 4/80 |
| | | | | 381/86 |

\* cited by examiner

USING PATTERNS TO PAIR BLUETOOTH DEVICES

CROSS-REFERENCE TO RELATED APPLICATIONS

N/A

BACKGROUND

Bluetooth pairing is the process for creating one or more shared secret keys that can be used to communicate securely. FIG. 1 provides an overview of the pairing process. In phase 1, the devices exchange pairing features such as authentication requirements and I/O capabilities. In phase 2, the security manager protocol (SMP) is used to generate keys for the connection such as a short term key in legacy pairing or a long term key for secure connections. In phase 3, which is optional, transport specific keys can be generated and exchanged.

A variety of methods, or association models, can be used as part of SMP in phase 2. In cases where both Bluetooth devices have displays and keyboards or other input devices (e.g., when a user wants to pair his computer with his smart phone), the "numeric comparison" association model may be used in which a number may be displayed on both devices and the user may be prompted to confirm that the numbers match. In cases where at least one of the devices does not have a display and keyboard (e.g., when a user wants to pair his smart phone with a headset), a "just works" association model may be used in which a number may be exchanged between the devices, but the number is not presented to the user for confirmation. Instead, the user may be prompted to accept the connection. In cases where one device has input capability but not a display and the other device has output capabilities (e.g., a PC and keyboard), a "passkey entry" association model may be employed in which a number is presented on the device having the display and the user is prompted to enter the number on the other device.

The just works association model provides protection against passive eavesdropping but provides no protection against man-in-the-middle attacks. Additionally, the just works association model does not provide a reliable way to know whether the intended device is being paired. For example, if there are many devices in range having the same name/description (e.g., multiple mice), the user cannot be sure whether he is attempting to pair with the intended device. However, the just works association model is the only option for many Bluetooth devices without displays or numeric input capabilities such as mice, headsets, styluses, etc.

BRIEF SUMMARY

The present invention extends to systems, methods and computer program products for using patterns to pair Bluetooth devices. A pattern can be used to ensure that the correct Bluetooth device is being paired. A pattern may also be used to provide security to the pairing process by encrypting the key exchange with keys generated from the pattern. In some implementations, the pattern to be used can be generated based on the device class.

In some embodiments, the present invention may be implemented as a method for pairing devices using a pattern. A pattern, which a second device is to perform as part of pairing with the first device, can be presented on the first device. The first device can then receive one or more pairing communications from the second device that identify a performed pattern. The first device can verify that the performed pattern matches the presented pattern. In response to verifying that the performed pattern matches the presented pattern, the first device can pair with the second device.

In some embodiments, the present invention may be implemented as computer storage media storing computer executable instructions which when executed implement a method for pairing devices using a pattern. In response to a request to pair a first device with a second device, a pattern can be selected. The pattern can be presented to a user via the first device. It can then be detected that the user has used the second device to perform the pattern. The first device can then be paired with the second device.

In some embodiments, the present invention may be implemented as a system that includes a first device and the second device. The first and second devices can be configured to pair using a pattern.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "device" should be construed as any computing device that is Bluetooth capable. The term "pattern" should be construed as encompassing shapes or paths (e.g., a shape in which a mouse or stylus is moved, movement of an individual relative to a proximity device, etc.), sequences (e.g., a sequence of button presses, a sequence of taps on a touch device, a sequence of blinks of a light, etc.), combinations of shapes/paths and sequences (e.g., a sequence of shapes/letters drawn with a stylus), one or more words to be spoken (e.g., a word to be spoken into a microphone), one or more words or sounds that are played (e.g., a sound output by a speaker), images (e.g., a smile or frown captured by an imaging device), etc.

Embodiments of the present invention encompass techniques for enabling patterns to be used as part of the Bluetooth pairing process. As an overview, when a first device and a second device are attempting to pair, the first device having a display or other output device can present a pattern to the user or otherwise notify the user of the pattern. The user can then use the second device to create/perform the pattern. The second device can then send the pattern to the first device for verification. The verification of the pattern can serve to confirm that the intended device is being paired and/or to provide security to the connection.

Figure 1:
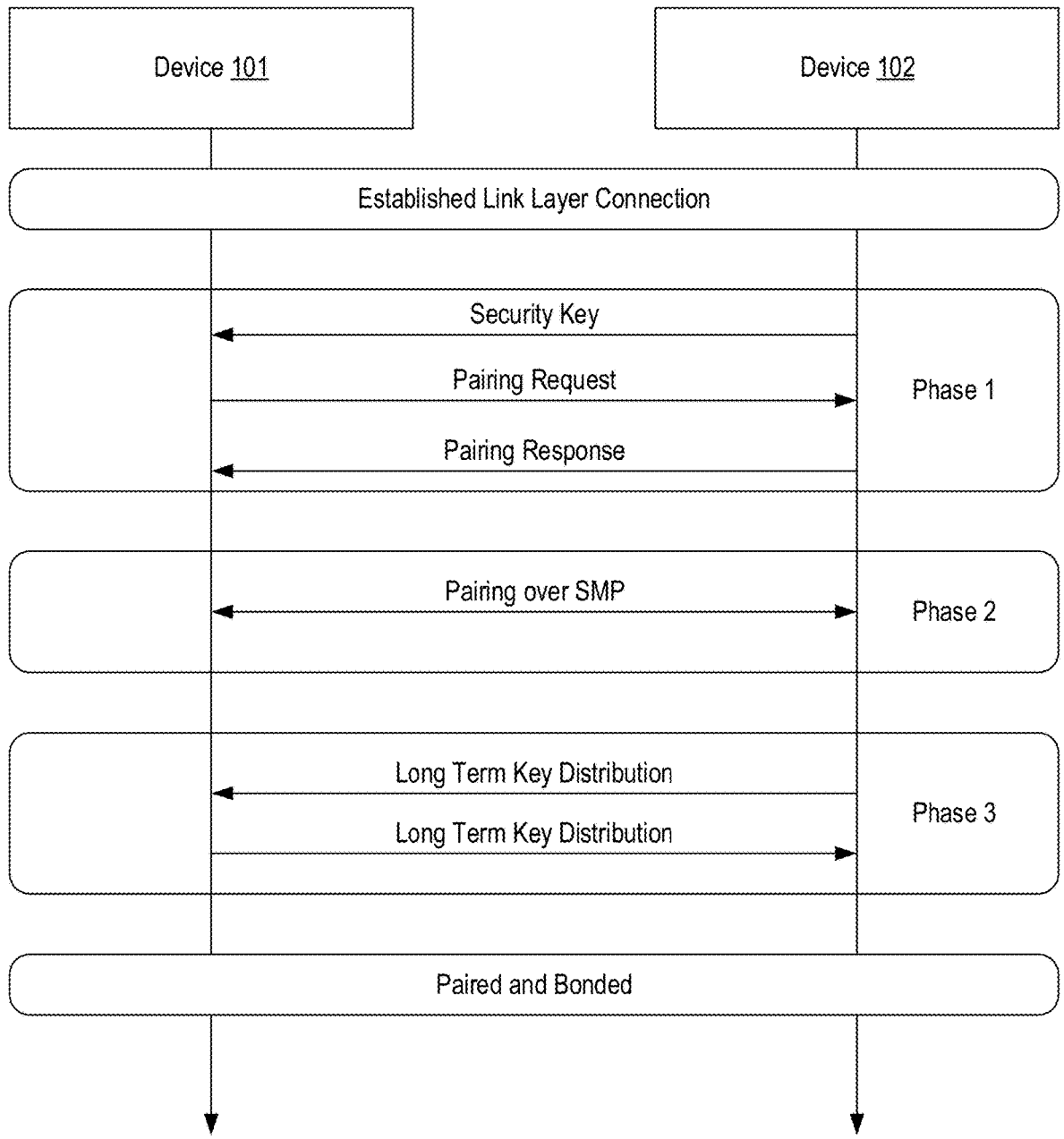
FIG. 1 is a diagram of the Bluetooth pairing process.
Figure 2A:
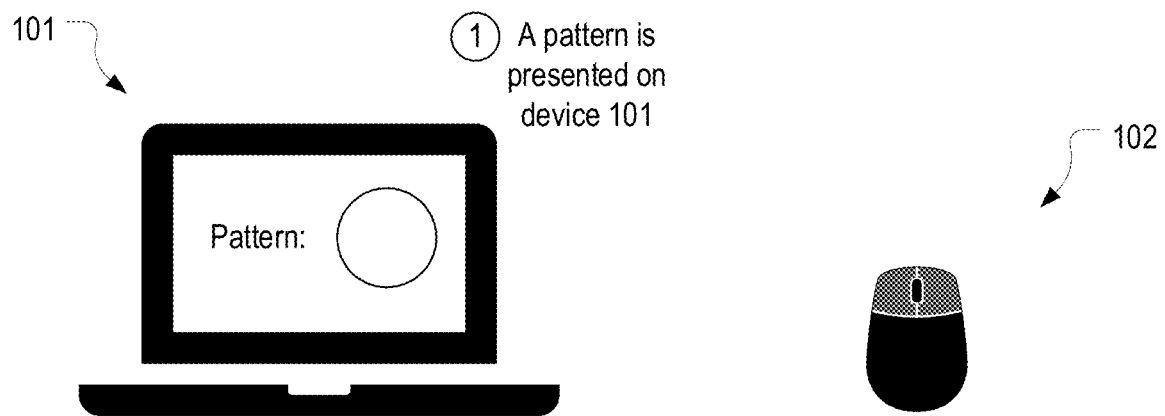
FIGS. 2A-2D provide an example of how patterns may be used in the Bluetooth pairing process in accordance with one or more embodiments of the present invention.

FIGS. 2A-2D provide an example from the user perspective of how embodiments of the present invention may be implemented when device 101 is a personal computer and device 102 is a mouse. In particular, FIGS. 2A-2D represent an example where a circle pattern is used as part of the pairing process between device 101 and device 102. In FIG. 2A, it is assumed that device 101 and device 102 have completed phase 1 of the pairing process including confirming that pattern-based pairing is available. It is also assumed that device 101 has selected a circle as the pattern that device 102 is to perform. Accordingly, in step 1, an application/service on device 101 can present a circle to the user as the pattern that the user should perform using device 102. This pattern could be presented in any available manner including by displaying a circle, displaying the word "circle," audibly outputting the word "circle," etc. In some embodiments, the pattern that is selected can be based on the type of device that is to perform the pattern and/or can be selected randomly.

Figure 2B:
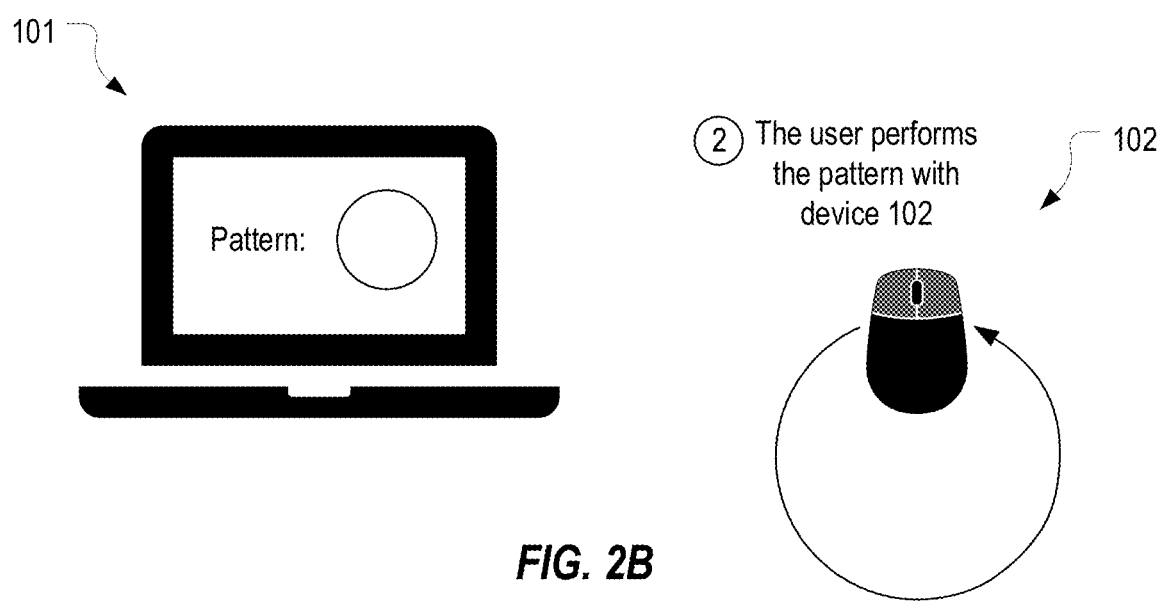
Figure 2C:
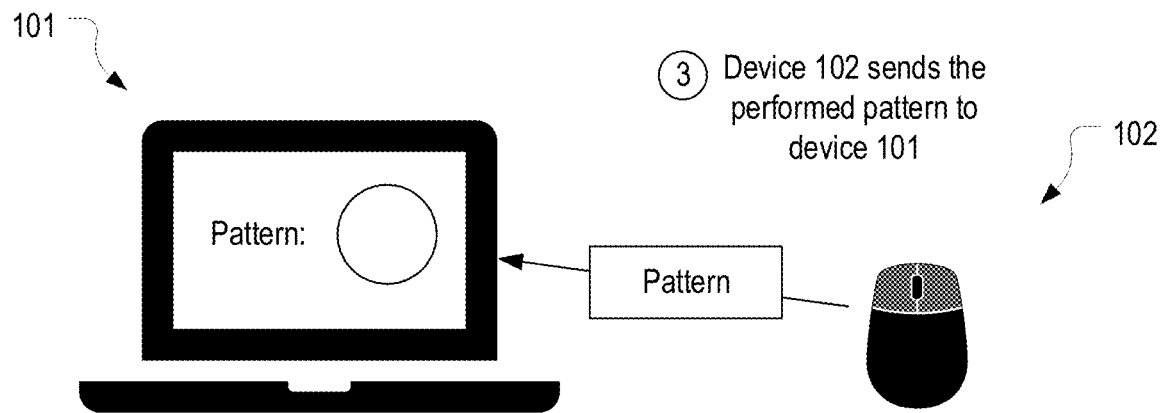
Figure 2D:
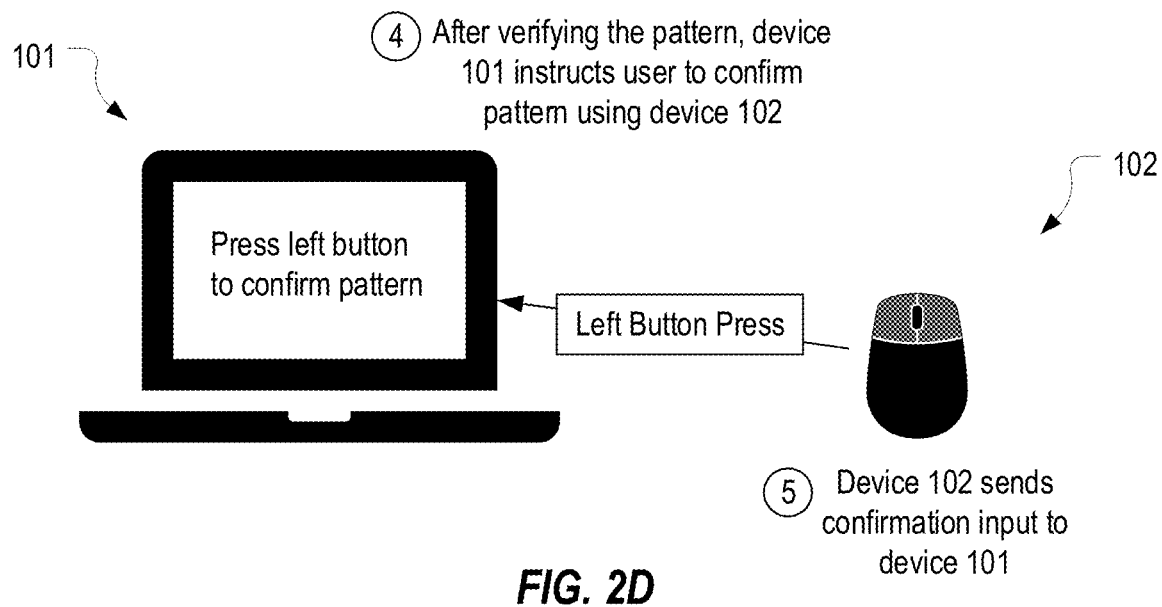

Turning to FIG. 2B, in step 2, the user can use device 102 to perform the pattern. In this example, the user can move device 102, which is a mouse, in a circle. Device 102 (e.g., firmware on device 102 configured to implement the techniques of the present invention) can capture this pattern and send it to device 101 as part of pairing communication in step 3 shown in FIG. 2C. The exact manner in which device 102 relays the performed pattern to device 101 is not essential to embodiments of the present invention. For example, device 102 could send one or more pairing communications containing a series of coordinates captured as device 102 is moved in the circle pattern, could detect the circle pattern locally and send one or more pairing communications containing an indication that a circle was performed, etc.

In response to receiving the performed pattern, device 101 can verify that the performed pattern matches the presented pattern. If the performed pattern matches the presented pattern, or in this example, if device 102 sends a pairing communication indicating that the user has moved or is moving device 102 in a circle, device 101 can verify that device 102 is the intended device with which device 101 should pair. In some embodiments, as part of verifying the performed pattern, device 101 can request confirmation from the user. For example, in step 4 shown in FIG. 2D, the application on device 101 has prompted the user to press the left button on device 102 to confirm the performed pattern (i.e., to confirm that the user intended for device 102 to be paired). Then, in step 5, the user can use device 102 to send confirmation input to device 101 such as by pressing the left button. In other embodiments, device 101 could allow the user to provide confirmation via device 101 such as via a selectable pop-up.

Figure 3:
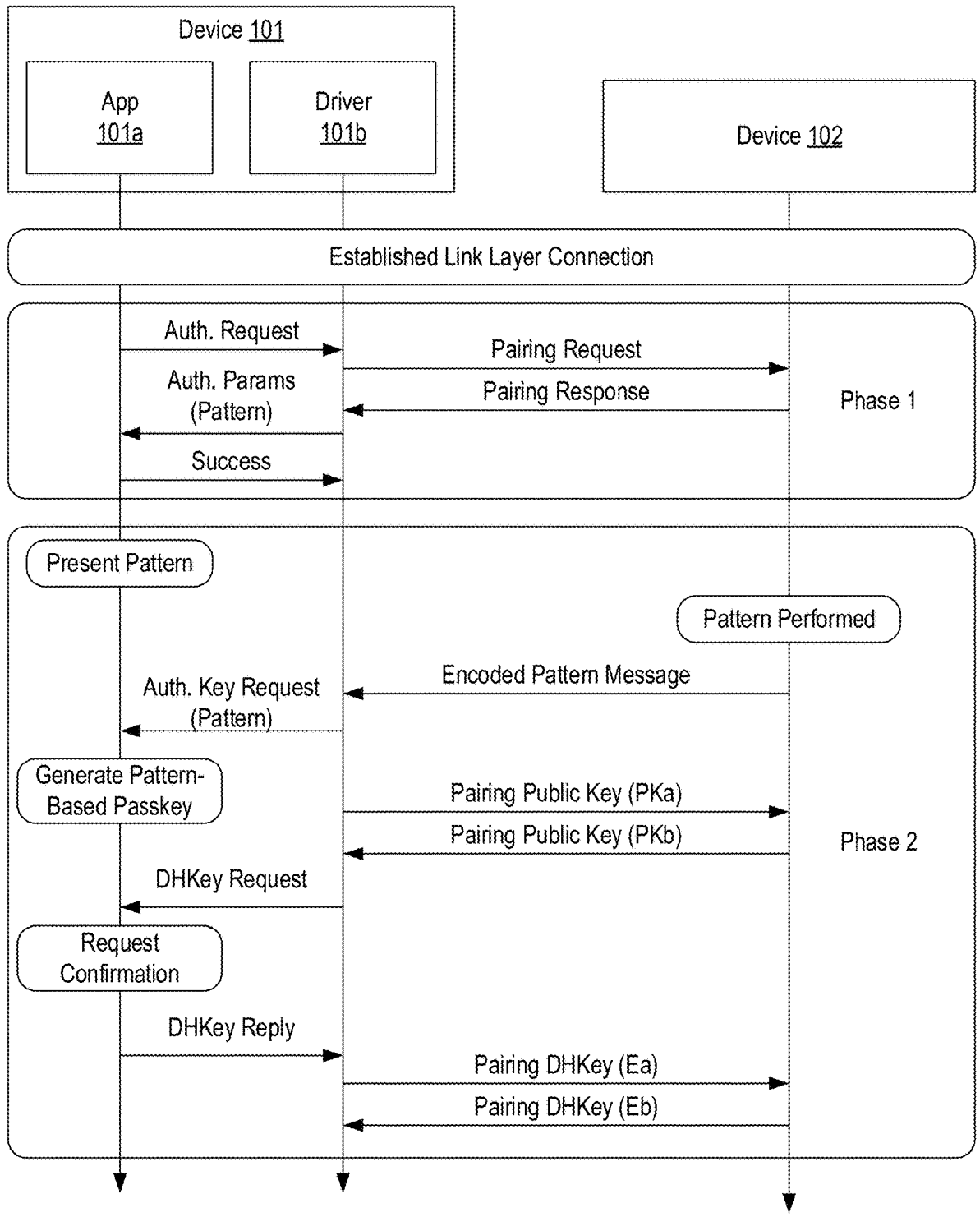
FIG. 3 is a diagram of a Bluetooth pairing process that employs patterns in accordance with one or more embodiments of the present invention.

FIG. 3 is a flowchart representing how patterns may be used as part of the pairing process in some embodiments of the present invention. In FIG. 3, only phases 1 and 2 are represented.

As shown, an application 101*a* on device 101 may initiate the pairing process by sending an authentication request to a Bluetooth driver 101*b*. In response, driver 101*b* can send a pairing request to device 102 to request its capabilities. This pairing request can identify device 101's capabilities and possibly parameters for the pairing (e.g., whether bonding should be performed, whether man-in-the-middle protection is required, etc.). Device 102 can send a pairing response which identifies its capabilities. In this example, it is assumed that device 102 is capable of performing pattern-based pairing, and therefore, the pairing response can identify that a pattern may be used for authentication/verification in phase 2. This pairing response may also identify input and/or output capabilities of device 102 (e.g., NoInput-NoOutput, KeyboardOnly, etc.). Assuming device 102 is a mouse, the pairing response may specify NoInputNoOutput. In response to receiving the pairing response, driver 101*b* can send the authentication parameters to application 101*a* which in turn can verify that pattern-based pairing is available for device 102. Accordingly, when embodiments of the present invention are implemented, phase 1 of the pairing process can include identifying whether the devices support pattern-based pairing. Although not shown, device 101 and device 102 can perform other steps of phase 1 of the pairing process such as exchanging public keys.

Assuming that application 101*a* confirms that device 102 supports pattern-based pairing, application 101*a* can then present a pattern on device 101. Application 101*a* may present the pattern via any available output device such as visibly on a display, audibly via a speaker, haptically, etc. In some embodiments, application 101*a* can select a pattern based on the type of device 102. For example, if device 102 is a mouse, application 101*a* may select a shape as the pattern that the user should perform using the mouse. If device 102 is a headset (or other device with buttons), application 101*a* may select a sequence of button presses as the pattern that the user should perform on the headset. If device 102 is a stylus, application 101*a* may select a shape or a sequence of letters, numbers or other characters as the pattern that the user should draw with the stylus. Other types of patterns could be selected for other types of devices depending on how the devices may be manipulated. Application 101*a* may select the pattern randomly to ensure that security is not compromised.

Once the pattern is presented on device 101, the user can use device 102 to perform the pattern. As the user performs the pattern, device 102 can generate an encoded pattern message which defines the pattern that was performed. For example, the encoded pattern message can define that the user moved or is moving device 102 in a circle. Device 102 can send the encoded pattern message to driver 102*b* which in turn can relay an authentication key request to application 101*a*. This authentication key request can identify the pattern that device 102 performed. Application 101*a* can then verify that the performed pattern matches the presented pattern, and if so, may continue with the pairing process.

In some embodiments, application 101*a* (or possibly device 102) can generate a pattern-based passkey. In other words, application 101*a* can generate a passkey that is based on the pattern that was presented/performed. As stated above, this pattern-based passkey can be used to generate keys for securing the connection between device 101 and device 102 in a similar manner as a typical passkey is used. For example, the pattern-based passkey could be a 6-digit passkey that is used in place of a typical passkey in the passkey entry protocol (e.g., as an input in the confirm value generation function, the check value generation function, and/or other functions used to calculate keys for securing the pairing process or to otherwise secure the connection). In some embodiments, application 101*a* (or possibly device 102) could convert the pattern into a 6-digit passkey using an algorithm (e.g., converting coordinates to a single numerical value). In other embodiments, application 101*a* could use mappings to select a 6-digit passkey for the performed pattern (e.g., circle=472893).

In some embodiments, prior to proceeding with the pairing process after the pattern has been verified, application 101*a* may request confirmation from the user. For example, after driver 101*b* and device 102 exchange pairing public keys and driver 101*b* submits a DHKey request, application 101*a* may present a confirmation request on device 101. This confirmation request could specify a particular type of input that the user should perform on device 102 such as pressing the left button on a mouse. Alternatively, this confirmation request could require input on device 101. In any case, if the user provides confirmation, the pairing process can continue with the exchange of DHKeys and the completion of the pairing process. Once pairing is complete, the long term key(s) can be stored (or bonded) to enable device 101 and device 102 to subsequently connect without repeating the pairing process.

As can be seen, embodiments of the present invention provide enhanced security to Bluetooth connections because users can know that they are pairing with the intended device even when the device does not have a display or keyboard. Additionally, the use of patterns enables a pattern-based passkey to be generated for securing the pairing process.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for pairing devices using a pattern, the method comprising:
presenting, on a first device, a pattern in which a user is to move a second device to pair the second device with the first device;
in response to the user moving the second device to perform the pattern, receiving, by the first device, one or more pairing communications from the second device, the one or more pairing communications identifying the performed pattern in which the user moved the second device;
verifying, by the first device, that the performed pattern matches the presented pattern; and
in response to the first device verifying that the performed pattern matches the presented pattern, pairing with the second device such that the pairing is performed in response to the user moving the second device to perform the pattern that was presented on the first device.

2. The method of claim 1, wherein presenting the pattern comprises displaying the pattern.

3. The method of claim 1, wherein presenting the pattern comprises audibly outputting the pattern.

4. The method of claim 1, wherein the one or more pairing communications identify the performed pattern by providing coordinates of the performed pattern.

5. The method of claim 1, wherein the performed pattern comprises a shape.

6. The method of claim 1, wherein the performed pattern comprises a sequence.

7. The method of claim 1, wherein the performed pattern comprises a path.

8. The method of claim 1, wherein pairing with the second device comprises using the pattern to generate a pattern-based passkey.

9. The method of claim 8, wherein the pattern-based passkey is used to generate one or more keys for securing communications between the first and second device.

10. The method of claim 1, further comprising:
after verifying that the performed pattern matches the presented pattern, prompting a user for confirmation before proceeding to pair the first device with the second device.

11. The method of claim 10, further comprising:
receiving the confirmation from the user via the second device.

12. The method of claim 1, wherein the first device randomly selects the pattern to present.

13. The method of claim 1, wherein the first device selects the pattern to present based on a type of the second device.

14. One or more computer storage media storing computer executable instructions which when executed implement a method for pairing devices using a pattern, the method comprising:
- in response to a request to pair a first device with a second device, selecting a pattern in which a user is to move the second device to pair the second device with the first device;
- presenting the pattern to the user via the first device to invite the user to move the second device to perform the pattern;
- in response to the user moving the second device to perform the pattern, detecting that the user has moved the second device to perform the pattern; and
- in response to detecting that the user has moved the second device to perform the pattern that was presented on the first device, pairing the first device with the second device such that the pairing is performed in response to the user moving the second device to perform the pattern that was presented on the first device.

15. The computer storage media of claim 14, wherein pairing the first device with the second device comprises using a passkey generated from the pattern.

16. The computer storage media of claim 14, wherein the pattern is selected based on a type of the second device.

17. The computer storage media of claim 14, wherein the pattern is selected randomly.

18. The computer storage media of claim 14, wherein detecting that the user has moved the second device to perform the pattern comprises the first device receiving one or more pairing communications from the second device.

19. A system comprising:
a first device; and
a second device;
wherein the first and second devices are configured to perform a method to pair using a pattern, the pattern comprising one or more of:
a shape or a path along which the second device is moved;
a sequence of movements on or by the second device; or
a visual pattern captured by the second device;
wherein the method comprises;
- presenting, on the first device, the pattern in which a user is to move the second device to pair the second device with the first device;
- in response to the user moving the second device to perform the pattern, receiving, by the first device, one or more pairing communications from the second device, the one or more pairing communications identifying the performed pattern in which the user moved the second device;
- verifying, by the first device, that the performed pattern matches the presented pattern; and
- in response to the first device verifying that the performed pattern matches the presented pattern, pairing with the second device such that the pairing is performed in response to the user moving the second device to perform the pattern that was presented on the first device.

20. The system of claim 19, wherein the pattern is presented on or by the first device to inform a user of the second device.

* * * * *